(12) United States Patent
Baechtle et al.

(10) Patent No.: US 12,349,718 B2
(45) Date of Patent: Jul. 8, 2025

(54) ASSEMBLY AND SYSTEM FOR THE PRODUCTION OF PASTY SHAPED PARTS

(71) Applicant: Albert Handtmann Maschinenfabrik GmbH & Co. KG, Biberach (DE)

(72) Inventors: Manfred Baechtle, Schemmerhofen (DE); Bernd Romer, Laupheim (DE); Daniel Teufel, Schemmerhofen (DE); Rudolf Hirsch, Weingarten (DE)

(73) Assignee: ALBERT HANDTMANN MASCHINENFABRIK GMBH & CO. KG, Biberach (DE)

( * ) Notice: Subject to any disclaimer, the term of this patent is extended or adjusted under 35 U.S.C. 154(b) by 345 days.

(21) Appl. No.: 17/207,551

(22) Filed: Mar. 19, 2021

(65) Prior Publication Data
US 2021/0298344 A1 Sep. 30, 2021

(30) Foreign Application Priority Data
Mar. 27, 2020 (DE) .......................... 102020204024.9

(51) Int. Cl.
*A23P 30/10* (2016.01)
*A22C 7/00* (2006.01)
*A22C 17/00* (2006.01)
*A21C 11/10* (2006.01)

(52) U.S. Cl.
CPC ............... *A23P 30/10* (2016.08); *A21C 11/10* (2013.01); *A22C 7/0007* (2013.01); *A22C 17/0006* (2013.01)

(58) Field of Classification Search
CPC ...... A22C 17/0006; A21C 11/10; A23P 30/10
See application file for complete search history.

(56) References Cited

U.S. PATENT DOCUMENTS

| | | | | |
|---|---|---|---|---|
| 4,068,008 | A * | 1/1978 | Orchard | A22C 7/00 426/272 |
| 4,205,415 | A * | 6/1980 | Orchard | A22C 7/00 425/298 |
| 8,376,728 | B2 * | 2/2013 | Le Paih | A22C 17/0006 425/312 |
| 8,616,099 | B2 * | 12/2013 | Hallvardsson | A22C 17/02 83/13 |
| 9,668,492 | B2 * | 6/2017 | Baechtle | A22C 13/0003 |

(Continued)

FOREIGN PATENT DOCUMENTS

CN 86102032 A 9/1986
CN 2064163 U 10/1990
(Continued)

OTHER PUBLICATIONS

State Intellectual Property Office of the People's Republic of China, Office Action and Search Report Issued in Application No. 202110310061.8, Feb. 23, 2022, 11 pages. (Submitted with Partial Translation).

*Primary Examiner* — Seyed Masoud Malekzadeh
(74) *Attorney, Agent, or Firm* — McCoy Russell LLP

(57) ABSTRACT

An assembly between a filling machine and a conveyor for the production of pasty shaped parts, having various shape-generating elements which are adapted to the respective shape of differently shaped parts and can be driven, has an outlet and at least one universal drive and bearing interface for the shape-generating elements which can be driven via the interface.

18 Claims, 2 Drawing Sheets

(56) References Cited

U.S. PATENT DOCUMENTS

| | | | |
|---|---|---|---|
| 10,375,980 B2* | 8/2019 | Baechtle | A23L 13/65 |
| 2009/0145306 A1* | 6/2009 | Bearson | A23L 13/03 |
| | | | 426/104 |
| 2010/0031791 A1* | 2/2010 | Hallvardsson | A22C 17/02 |
| | | | 83/76.2 |
| 2010/0129513 A1* | 5/2010 | Le Paih | A22C 7/0007 |
| | | | 426/513 |
| 2013/0129851 A1* | 5/2013 | Le Paih | A22C 7/0007 |
| | | | 425/297 |
| 2014/0213162 A1* | 7/2014 | Betz | A22C 11/0209 |
| | | | 452/35 |
| 2014/0287666 A1* | 9/2014 | Baechtle | A22C 13/0006 |
| | | | 452/40 |
| 2015/0150271 A1* | 6/2015 | Bearson | A23L 5/10 |
| | | | 99/335 |
| 2016/0262405 A1* | 9/2016 | Rathmann | A22C 11/00 |
| 2016/0302467 A1* | 10/2016 | Baechtle | A22C 11/104 |
| 2021/0169091 A1* | 6/2021 | Mayr | A22C 17/002 |

FOREIGN PATENT DOCUMENTS

| | | | |
|---|---|---|---|
| CN | 1784298 A | | 6/2006 |
| CN | 108522614 A | | 9/2018 |
| DE | 102008013806 A1 | | 10/2009 |
| EP | 1447006 A1 | | 8/2004 |
| EP | 3066932 A1 | | 9/2016 |
| EP | 3081089 A1 | | 10/2016 |

* cited by examiner

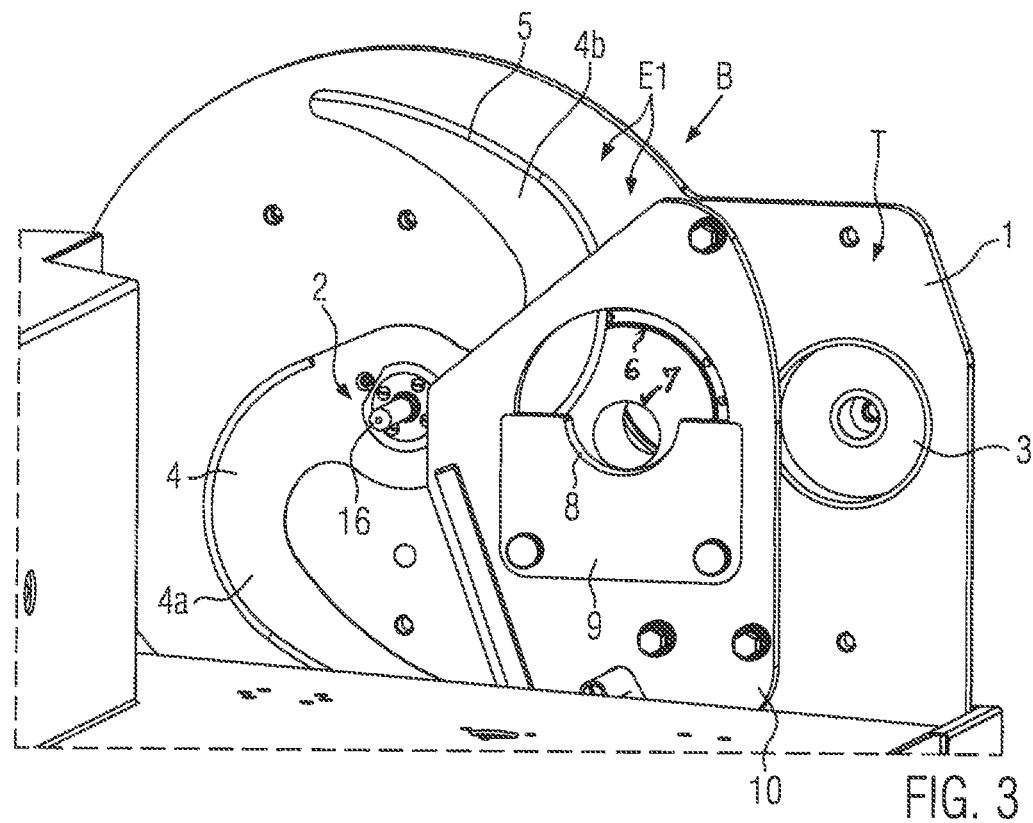
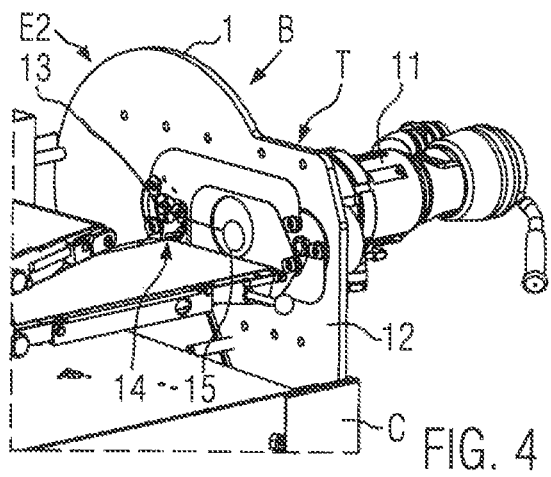
FIG. 3
FIG. 4
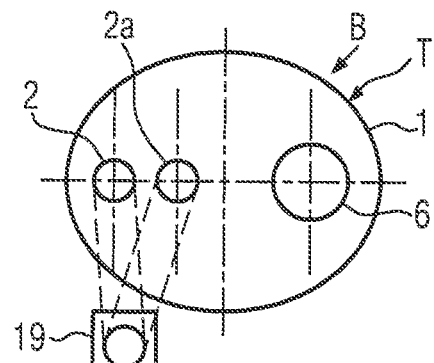
FIG. 5
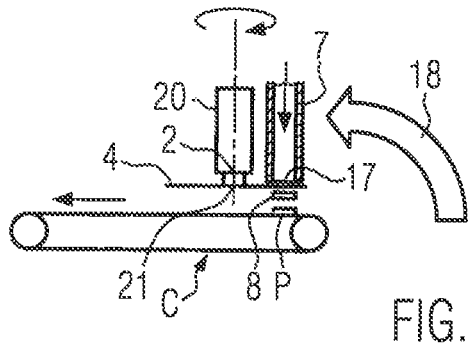
FIG. 6
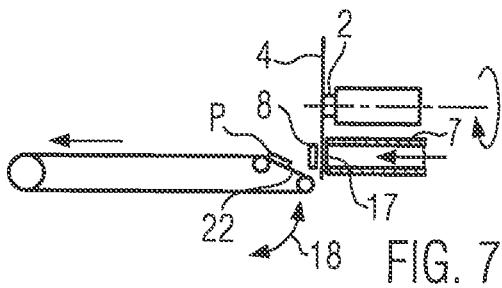
FIG. 7

ASSEMBLY AND SYSTEM FOR THE PRODUCTION OF PASTY SHAPED PARTS

CROSS REFERENCE TO RELATED APPLICATION

The present application claims priority to German Patent Application No. 102020204024.9 filed on Mar. 27, 2020. The entire contents of the above-listed application is hereby incorporated by reference for all purposes.

TECHNICAL FIELD

The invention refers to an assembly according to the generic term of claim 1 and to a system according to claim 17.

BACKGROUND AND SUMMARY

From EP 3 081 089 A1 an assembly with a perforated disc mechanism is known which uses rotating perforated discs to portion and form from the strand spheres, cylinders with rounded edges or plugs of pasty material. Exact cylinders or circular cylindrical discs cannot be produced. As an alternative to perforated discs, mechanisms with a diaphragm can be used for rounded shaped parts.

From EP 1 447 006 A1 it is known to produce circular cylindrical shaped parts by means of a rotary knife. The rotary knife penetrates at least partially into the channel containing the strand. Rounded shaped parts cannot be produced.

A plurality of machines are required for the optional production of different shaped parts, e.g. cylinders or spheres, as the product shapes require different functional principles.

It is known from EP 3 066 932 A1 that, for the production of shaped parts with different shapes, one module of a plurality of modules equipped with different shape-generating elements is coupled to the conveying machine. When the shape changes, the module is exchanged for another. Each module has permanently installed shape-generating elements and a drive for them. The modules are expensive to purchase. Retrofitting is time-consuming and labor-intensive.

The invention is based on the object of providing an assembly of the type mentioned above or a system for the production of pasty shaped parts, with which shaped parts of different shapes can be optionally produced, and a respective retrofitting can be carried out simply and quickly, and only few parts are required for this procedure.

The object is achieved with the features of patent claim 1 and the system according to patent claim 17.

To change from one shape of the shaped parts to another, only the shape-generating elements need to be exchanged. The mounting carrier remains in place. The different shape-generating elements use the same universal drive and bearing interface and thus a single drive. Only few parts are required, which are easy to manufacture and clean. The cost is moderate. Retrofitting procedures are not time-consuming or labor-intensive. This concept enables a wide range of products with high dimensional accuracy of the shaped parts.

In the system, when the shape of the produced shaped parts is to be changed, only the shape-generating elements that use the same mounting carrier and the same universal drive and bearing interface need to be exchanged. Generally, the transport distance from the filling machine to the conveyor can be short in the system, which benefits the shaped parts quality.

It is expedient to connect the at least one interface to a rotary drive which is installed on or separately from the mounting carrier, preferably in the filling machine or in its machine frame. This placement of the rotary drive makes use of the available installation space anyway and shortens the transport distance.

In an expedient embodiment, the interface has a drive shaft and at least one detachable fixing for the shape-generating element. The rotary movement for the shape-generating element is transmitted via the drive shaft. The fixing holds the shape-generating element to the interface or the mounting carrier.

A shaped tube defining the respective strand cross-section can be exchangeably fixed in a passage of the mounting carrier. The mounting carrier thus provides a stable support for the shaped tube.

The respective shape-generating element can be at least one rotary knife or a perforated disc mechanism mounted on the side of the mounting carrier facing the conveyor. The rotary knife can be used to produce true-to-shape circular cylindrical shaped parts. The perforated disc mechanism, on the other hand, can be used to produce round, drop-shaped or rounded shaped parts. The assembly preferably can be equipped with a rotary knife or the perforated disc mechanism. This is not to be understood restrictively, but other drivable shape-generating elements can use the mounting carrier and the interface in exactly the same way.

The rotary knife has one or a plurality of preferably sickle-shaped cutting edges distributed around a knife axis. Angled cutting edges are formed on the cutting edges, and the smooth side of the rotary knife or its cutting edges may be placed adjacent to the mounting carrier so that the angled cutting edges push the shaped parts cut from the strand away from the strand toward the conveyor. Sickle-shaped cutting edges ensure a clean but pulling cutting action through the strand. Alternatively, straight cutting edges could be provided, or a rotary knife having double-sided cutting edges that is moved oscillatingly back and forth through the strand.

According to an important aspect of the invention, the outlet end of the shaped tube placed in the mounting carrier forms a counter cutting edge for the rotary knife's cutting edge. The outlet end can be placed flush or protruding in the mounting carrier. An interaction between the cutting edge and the counter cutting edge results in a clean cut.

According to another important aspect of the invention, on the side of the rotary knife facing away from the mounting carrier, a transfer slide, e.g. arc-shaped, mounted on the mounting carrier is aligned with the shaped tube and is arranged behind the cross-section of the shaped tube in the direction of rotation of the rotary knife. The transfer slide guides the shaped part, which has been separated from the strand and pushed away by the rotary knife, to the receiving conveyor. The distance between the transfer slide and the rotary cutting edge can be small, e.g. only a few tenths of a millimeter.

It is expedient for the transfer slide to extend over approximately 180° with a predetermined width in the conveying direction and in radian measure. It can have an approximately circular cylindrical arc curvature, which corresponds approximately to the arc curvature of the cross-section of the largest shaped tube that can be mounted in the outlet. Thus, one and the same transfer slide can be used for shaped parts made from strands of different cross-sections or diameters. It may only be necessary to align the position of the transfer slide to the particular shaped tube used, or to adapt it to its diameter.

The width of the transfer slide can be between about 1.0 to 2.5 cm, and is preferably about 1.5 cm. This width ensures safe guidance of each product to be transferred to the conveyor.

The transfer slide can be arranged at the edge of a plate-shaped insert, which is exchangeably fixed in an opening of a holder mounted on the mounting carrier. Either the insert or the holder can be readjustable to adapt to the size and/or diameter of the inserted shaped tube.

In a structurally simple and space-saving embodiment, the mounting carrier is a plate installed upright, in which an additional bearing point for the perforated disc mechanism, for example, may be provided on the side of the strand outlet opposite the interface. When the rotary knife is used, the bearing point may not be required. When the perforated disc mechanism is used, the optional bearing point and the interface provide more stable support for the mechanism.

In this context, the perforated disc mechanism can comprise at least two perforated discs which are located one on top of the other and can be moved relative to one another, each with an opening. The discs are coupled to a control disc which is drivably mounted at the interface, and, for stability reasons, preferably may also be coupled to a further control disc which is rotatably mounted in the bearing point of the mounting carrier.

It is expedient that either the assembly is equipped with a frame, which can preferably be connected to the filling machine, or that the mounting carrier can be attached directly to the filling machine.

In another embodiment, the mounting carrier may have a plurality of drive interfaces at different distances from the strand outlet that can be selectively coupled to the rotary drive. This can be useful, for example, with different rotary knives for large-diameter or small-diameter shaped parts, so that the respective rotary knife operates as close as possible to the strand outlet in order to allow a high number of cycles even with a moderate drive rotation speed.

Another important aspect of the invention is that the assembly can be tilted relative to the conveyor and/or the conveyor or a conveyor element of the conveyor taking over the shaped parts can be tilted relative to the assembly, respectively for about 90°. This measure makes it possible to adjust, for example steplessly, the depositing angle of the shaped parts to the receiving conveyor and also the mutual distance, for example to ensure the gentlest possible transfer of the shaped parts.

BRIEF DESCRIPTION OF THE FIGURES

The subject matter of the invention is explained with reference to the drawing.

FIG. 3 shows a front view of an assembly with shape-generating elements for producing true-to-shape circular cylindrical shaped parts, as part of the system of FIG. 1, FIG. 4 shows a perspective view of the assembly with another shape-generating element for the production of round shaped parts, FIG. 5 shows a detailed variant of the assembly, in a schematic front view, FIG. 6 shows a schematic side view illustrating a possible relative positioning between the assembly and the conveyor, and FIG. 7 shows a schematic side view of another possible relative positioning between the assembly and the conveyor. The figures are drawn to scale, although other relative dimensions may be used.

DETAILED DESCRIPTION

Figure 1:
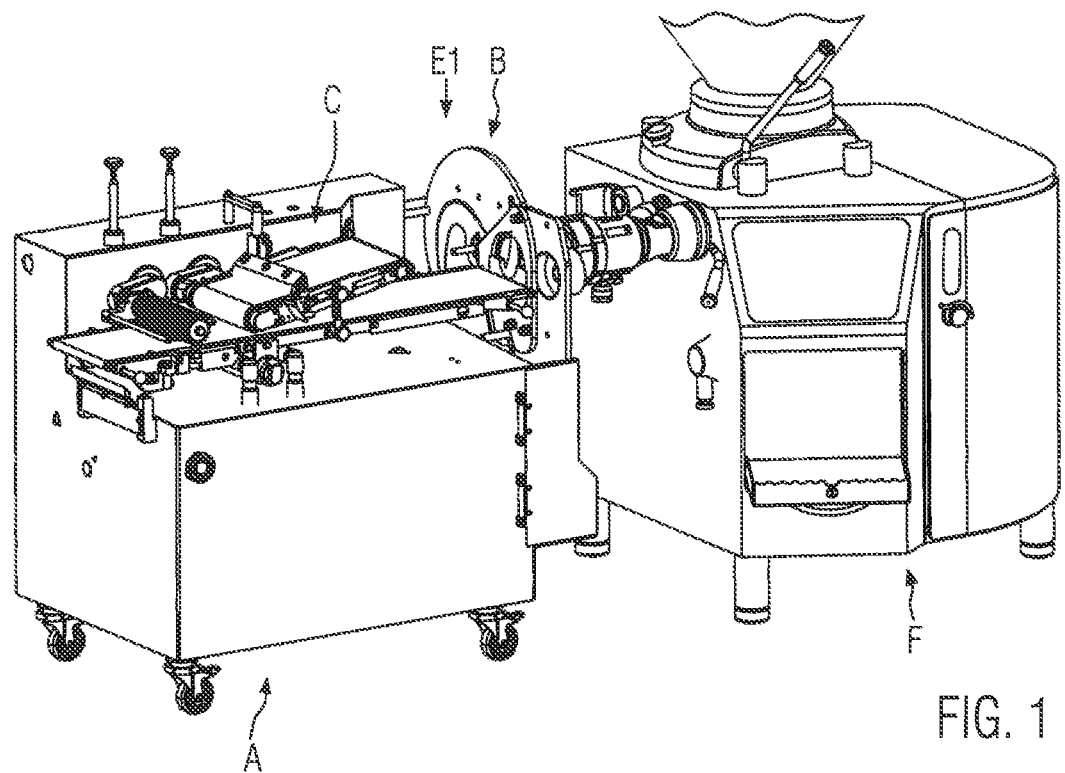
FIG. 1 shows a schematic perspective view of a system for producing pasty shaped parts in a setup state.
Figure 2:
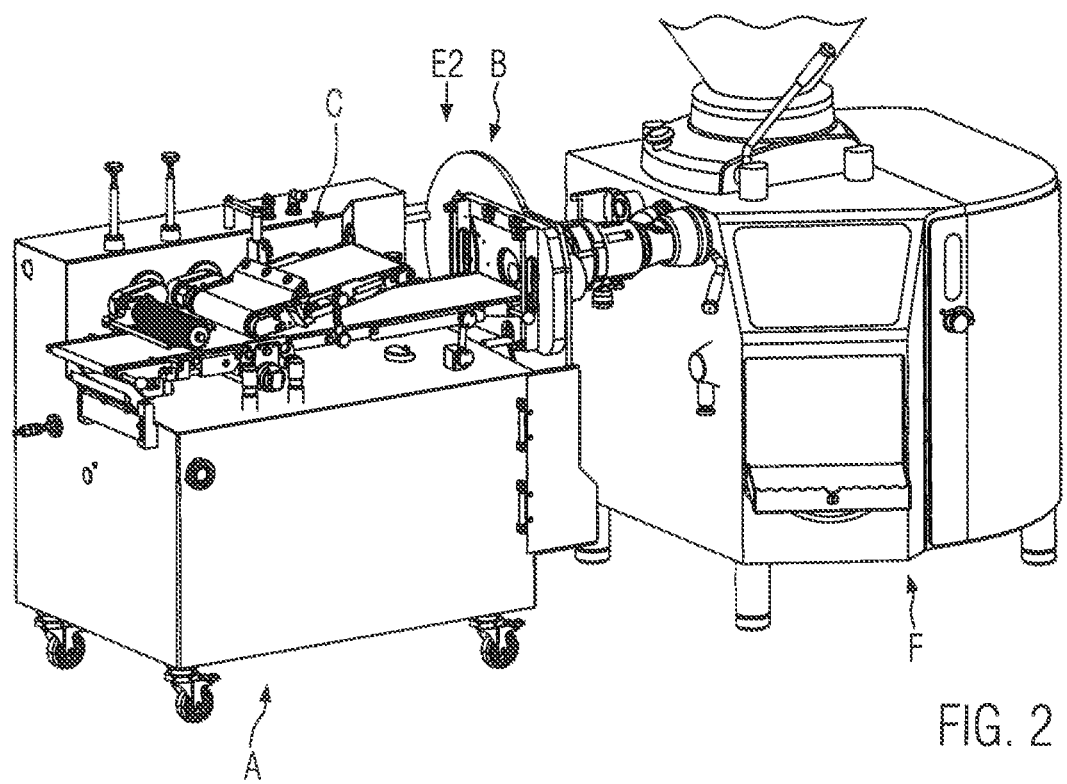
FIG. 2 shows a schematic perspective view of the system retrofitted for the production of shaped parts of a different shape.

FIGS. 1 and 2 show the same system A in two different setup states for the production of pasty shaped parts P, e.g. meat-based or vegan-based shaped parts. The main components of the system A are a filling machine F, a conveyor C set up separately therefrom, and an assembly B arranged in between and here connected to the filling machine F or supported in some other way.

The filling machine F provides a continuous strand from which the assembly B portions and shapes the shaped parts P and transfers them to the conveyor C, which conveys away the produced shaped parts P.

In the setup state of the assembly B in FIG. 1, the assembly B is equipped with a rotary knife 4 as the shape-generating element E1 (see FIG. 3), and with a transfer slide 8, namely for the production of circular cylindrical shaped parts P. The use of the transfer slide is optional and depends, among other things, on the type of knife used. In FIG. 2, on the other hand, assembly B is retrofitted and equipped with a perforated disc mechanism 12 as the shape-generating element E2, namely for the production of round or rounded shaped parts P.

The assembly B in FIG. 3 has a mounting carrier T, e.g. in the form of a plate 1 mounted upright, which is supported in a stationary manner and has at least one universal drive and bearing interface 2 on the side next to an eg round outlet 6. On the side of the outlet 6 opposite the interface 2, a further bearing point 3 may be provided in the mounting carrier T. The interface 2 contains a drive shaft 20 (see FIGS. 6, 7) and a fixing 16 or 21 for rotatably mounting the respective shape-generating element E1 or E2, in FIG. 3 E1.

For the production of circular cylindrical shaped parts, in FIG. 3 the rotary knife 4 is mounted on the interface and has two cutting arms 4a, 4b distributed around the axis of the rotary knife, here for example sickle-shaped, each of which has an oblique cutting edge 5 and can be smooth on the side facing the mounting carrier T. The rotary knife 4 may have only one cutting arm or more than two cutting arms; straight or otherwise shaped cutting edges are also conceivable. Alternatively, a double-edged knife oscillating back and forth or a wire cutter can be used.

A shaped or profiled tube 7 is permanently installed in the outlet 6, which determines the shape and cross-section of the strand processed by the assembly B. The shaped tube 7 is fixed in the outlet 6. In the embodiment shown in FIG. 3, for example, the shaped and eg round tube 7 is considerably smaller than the outlet 6. The outlet end 17 (FIGS. 6, 7) of the shaped tube 7, which is fixed in the mounting carrier T, can form a counter-cutting edge for the rotary knife 4, and can be placed flush with or protruding from the mounting carrier.

Furthermore, in FIG. 3, a plate-shaped holder 10 is optionally mounted on the mounting carrier T. The holder 10 has a larger opening than the outlet 6, and in which a plate-shaped insert 9 is mounted, which with its edge forms a transfer slide 8 for the manufactured shaped parts 7, which in the embodiment shown is curved in the shape of an arc, e.g. with a radius of curvature which is larger than the radius of curvature of the shaped tube 7, but is aligned with the shaped tube 7, so that approximately the deepest point of the transfer slide 8 lies at the level of the deepest point of the cross-section of the shaped tube 7, and optionally only a few tenths of a millimeter away from the rotary knife 4. In the embodiment shown, the transfer slide 8 extends over approximately 180° in radian measure, but may extend over a smaller range than shown. Alternatively, the radius of curvature of the transfer slide 8 could be relatively exactly matched to the radius of curvature of the cross-section of the shaped tube 7. The transfer slide 8 has a predetermined width in the direction of conveyance of between about 1.0 to 2.5 cm, preferably about 1.5 cm, and may be made of a smooth, low-friction material or have a smooth and low-friction coating, for example PTFE.

The bearing point 3 is adapted to accommodate a rotatably mounted control disc, not shown, of the perforated disc mechanism 12 indicated in FIG. 2.

FIG. 4 illustrates the assembly B in the second setup state. Here, the perforated disc mechanism 12 is mounted on the mounting carrier T, and comprises at least two perforated discs 13 lying one on top of the other, each with a passage opening 15. The perforated discs 13 are driven by a control disc mounted on the interface 2, which moves back and forth through a restricted angle, so that the passage opening formed by both discs 13 is periodically enlarged and reduced, for example, in order to portion and shape spherical or rounded shaped parts P from the strand passing through. The transfer slide 8 (option) shown in FIG. 3 could also be provided in this second setup state. FIG. 4 also shows a tube strand 11 extending from the filling machine F, through which the pasty strand is conveyed into the shaped tube F installed in the mounting carrier T and through the perforated disc mechanism 12. As seen in FIG. 3 and FIG. 4, in one or more examples, the rotary knife is configured to be directly mounted at the fixing, and the perforated disc mechanism is configured to be directly mounted at the fixing.

FIG. 5 illustrates a detailed variant of assembly B. Here, a plurality of universal rotary drive and bearing interfaces 2, 2a are provided at different distances from the outlet 6 in the mounting carrier T. Each interface may optionally be connected to a rotary drive 19, e.g. via toothed belts. Depending on whether a large shaped tube F is used, or a smaller shaped tube, one interface 2 or the other interface 2a is used to drive the shape-generating element E1 or E2. For example, with a large shaped tube 7 and a large rotary knife 4, interface 2 is used, whereas with a small shaped tube 7 and a smaller rotary knife 4, interface 2a is used, so that with interface 2a a higher dynamic response of the smaller rotary knife 4 and thus a higher portioning capacity can be achieved.

In FIG. 6, it is schematically indicated that the assembly B is tilted by up to about 90° in the direction of an arrow 18 from the position shown in FIG. 3 relative to conveyor C, so that shaped parts P separated by rotary knife 4 are deposited from above onto conveyor C via transfer slide 8.

FIG. 7, on the other hand, indicates that the conveyor C may be tilted in relation to the assembly B positioned according to FIG. 3 in such a way that the shaped parts P are gently transferred via the transfer slide 8 onto an ascending part 22 of the conveyor C. This part 22 of the conveyor or the entire conveyor can be tilted in the direction of the double arrow 18 by up to ±60°, preferably by up to ±45°, from a horizontal position. This part 22 of the conveyor or the entire conveyor can be tilted in the direction of the double arrow 18 by up to about ±60°, preferably by up to ±45°, from the horizontal position. A combination of the measures of FIGS. 6 and 7 is also possible, i.e. a partial tilting of the assembly B and a partial tilting of the conveyor or the part 22 of the conveyor.

To retrofit the system or the assembly, only the shape-generating elements E1, E2 need to be exchanged for each other and mounted on the mounting carrier T. The different shape-generating elements E1, E2 use the same universal drive and the bearing interface 2, 2a. Thus, in the setup state according to FIG. 1 and FIG. 3, exactly disc-shaped shaped parts P with exactly circular cylindrical or any other shape can be produced, whereas in the setup state according to FIG. 2 and FIG. 4, spherical or rounded or drop-shaped shaped parts P can be produced. By exchanging only a few parts, a wide range of products may be produced by one and the same system A.

The illustrations in the Figures do not show any housing parts which are usually fitted in the area of assembly B, and if necessary also in the area of the conveyor. If the assembly B is tilted relative to the conveyor V as in FIG. 6, then an elbow pipe can be installed instead of the tube strand 11 in FIG. 4. A diaphragm arrangement could be used instead of the perforated disc mechanism 12 in FIG. 4.

The financial outlay for convertibility of the system A is only moderate. Furthermore, there is a favorably short transport distance from the filling machine F to the shape-generating element E1 or E2 and to the conveyor C, since the rotary drive 19 (FIG. 5) can be installed in the machine stand or frame of the filling machine or in a machine stand of the assembly B in such a way that it does not project toward the filling machine F. A short transport distance is usually favorable for product quality reasons.

The invention claimed is:

1. An assembly for producing pasty shaped parts from a strand, the assembly being configured for arrangement between a filling machine supplying the strand and a conveyor taking over the shaped parts, the assembly comprising drivable shape-generating elements adapted to form a shape of the shaped parts, wherein, for a selective production of differently shaped parts and for retrofitting the shape-generating elements, the assembly has a mounting carrier, the mounting carrier comprising a universal drive and the universal drive bearing an interface for the shape-generating elements respectively driven via the interface, the interface comprising a drive shaft and a fixing adapted to mount to each of a rotary knife and a perforated disc mechanism, wherein the universal drive is configured to drive the rotary knife when the rotary knife is mounted at the mounting carrier via the fixing, and wherein the universal drive is configured to drive the perforated disc mechanism when the perforated disc mechanism is mounted at the mounting carrier via the fixing,
wherein the rotary knife is configured to be directly mounted at the fixing, and wherein the perforated disc mechanism is configured to be directly mounted at the fixing.

2. The assembly according to claim 1, wherein the interface is connectable to a rotary drive installed on or separately from the mounting carrier.

3. The assembly according to claim 1, wherein the interface comprises the drive shaft and the fixing for at least one of the shape-generating elements.

4. The assembly according to claim 2, wherein a shaped or profiled tube defining a strand cross-section is interchangeably fixed in an outlet of the mounting carrier.

5. The assembly according to claim 4, wherein the shape-generating element is the rotary knife or the perforated disc mechanism mounted on a side of the mounting carrier facing the conveyor.

6. The assembly according to claim 5, wherein the rotary knife has one or a plurality of cutting edges or cutting arms distributed around a knife axis.

7. The assembly according to claim 5, wherein an outlet end of the shaped tube placed in the mounting carrier forms a counter-cutting edge for the shape-generating element.

8. The assembly according to claim 7, wherein, on a side of the rotary knife facing away from the mounting carrier, a transfer slide for the shaped parts, mounted on the mounting carrier, is aligned with the shaped tube and is arranged behind the cross-section of the shaped tube in a direction of rotation of the rotary knife.

9. The assembly according to claim 8, wherein the transfer slide extends over approximately 180° with a predetermined width in a conveying direction and in radian measure, and has an approximately circular cylindrical arc curvature corresponding to the arc curvature of a cross-section of a largest shaped tube to be mounted in the outlet of the mounting carrier.

10. The assembly according to claim 8, wherein the transfer slide is formed on an edge of a plate-shaped insert interchangeably fixed in an opening of a holder mounted on the mounting carrier.

11. The assembly according to claim 1, wherein the mounting carrier is a plate installed upright.

12. The assembly according to claim 1, wherein either the assembly has a frame to be connected to the filling machine, or the mounting carrier to be attached directly to the filling machine.

13. The assembly according to claim 4, wherein the mounting carrier has a plurality of interfaces at different distances from the outlet, which interfaces can be selectively coupled to the rotary drive.

14. The assembly according to claim 1, wherein the assembly relative to the conveyor and/or the conveyor or at least one conveying element of the conveyor receiving the shaped parts relative to the assembly is/are tiltable over approximately +60°.

15. The assembly according to claim 2, wherein the mounting carrier is installed in the filling machine.

16. The assembly according to claim 8, wherein a width of the transfer slide is about 1.5 cm.

17. The assembly according to claim 1, wherein the rotary knife and the perforated disc mechanism are the shape-generating elements, wherein the rotary knife and the perforated disc mechanism are different shape-generating elements, and wherein the universal drive is a single drive.

18. The assembly according to claim 17, wherein the assembly is configured such that only the shape-generating elements are exchanged to change the shape of the shaped parts, the shape-generating elements configured to be coupled to the universal drive and the mounting carrier when exchanged.

* * * * *